April 2, 1929.  V. RETTERATH  1,707,279
PROCESS FOR THE MECHANICAL WORKING OF METALS
Filed Feb. 9, 1925
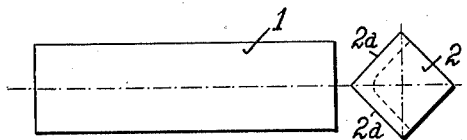
FIG.1.  FIG.1ª.
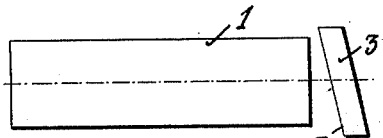
FIG.3.  FIG.3ª
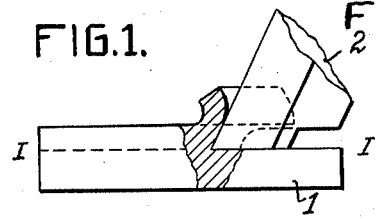
FIG.2.
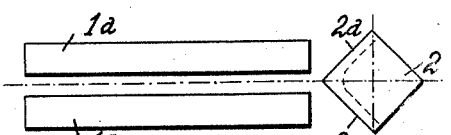
FIG.4.  FIG.4ª
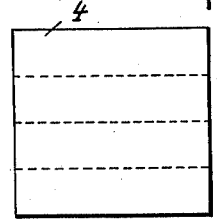
FIG.5ª
FIG.5.
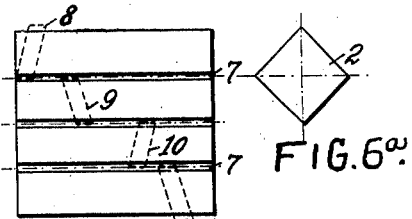
FIG.6.  FIG.6ª
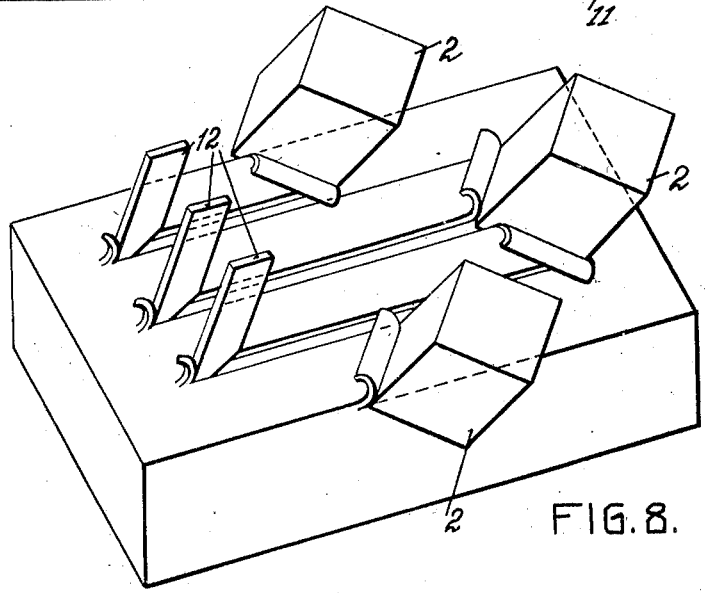
FIG.8.
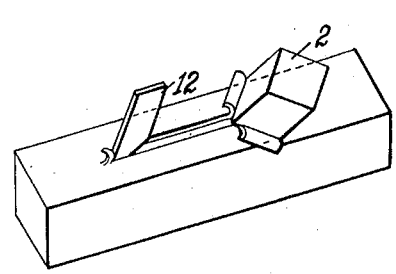
FIG.7.
Inventor:
Valentin Retterath,
by
his attorney Patented Apr. 2, 1929.

1,707,279

UNITED STATES PATENT OFFICE.

VALENTIN RETTERATH, OF INGOLSTADT, GERMANY.

PROCESS FOR THE MECHANICAL WORKING OF METALS.

Application filed February 9, 1925, Serial No. 7,784, and in Germany February 11, 1924.

The invention refers to a method of tooling a metal by stripping off a layer of the same.

Whereas hitherto tooling always proceeded only by separating from the work-piece the layer to be removed while simultaneously considerably reducing said layer into parts (shavings or turnings), which reduction in and by itself was unnecessary and wasteful, according to the method of the present invention, the entire layer to be removed is stripped off by its being engaged only in the plane of its division from the remainder of the work-piece.

The accompanying drawings diagrammatically illustrate by way of example the new method. In these drawings:—

Figs. 1–4ª illustrate the case in which the operative edge of the tool is wider than the work-piece or portion thereof to be worked thereby; in these figures:—

Figs. 1 and 1ª show in plan a work-piece and one form of tool and

Fig. 2 shows the same in elevation, the work-piece appearing partly in section.

Figs. 3 and 3ª show in plan a work-piece and a second form of tool and

Figs. 4 and 4ª show two work-pieces being tooled simultaneously by a single tool.

Figs. 5 and 5ª and 6 and 6ª show in plan work-pieces and tools illustrating further instances wherein very wide work-pieces are tooled by narrow tool steel elements according to the invention, Figs. 7 and 8 are perspective views showing respectively, mode of operation in trimming narrow and wide work-pieces according to Fig. 6.

Referring to the drawings, 1 indicates the work-piece and 2 or 3 the tool. In Fig. 1 the steel element of the tool, operating against the full width of material by means of the pointed part of its angularly disposed cutting edges 2ª, 2ª, engages exclusively in the plane I—I indicated by dotted lines in Fig. 2, that is, in the dividing plane which separates the layer to be stripped or peeled off from the remainder of the work-piece. In this mode of operation the cutting edge of the tool is rather highly stressed, because it has to work against the full width of material. The two operative cutting edges the lateral corners of which project beyond the work-piece effect the actual shearing or peeling action, throwing up the material in the manner of a plough.

In Fig. 3 is shown a steel element 3 set at an inclination to the direction of relative movement of tool and work-piece, this steel element being likewise wider than the work-piece and displacing the material only towards one side of the work-piece. This steel element in other respects engages in exactly the same manner as is shown in principle in Fig. 2, that is, with its lower edge 3ª only in the plane I—I.

Fig. 4 shows two work-pieces 1ª and 1ᵇ being tooled simultaneously by a single tool 2 of the kind shown in Fig. 1. The arrangement is such that the point of the tool runs between the two work-pieces and that one operative edge 2ª of the tool engages one work-piece and the other edge the other. In this case also the operative edges extend laterally beyond the work-pieces. This arrangement besides relieving the point possesses the further advantage that lateral pressures in the work-pieces themselves, are reduced to zero.

In all the forms of tool, it is preferred that the back of the tool is hollow, as indicated in Figs. 1 and 2 by dotted lines. The operative edges conveniently are lightly backed off to a smooth surface, which begins directly at the edge or at a small distance behind the same.

Up to what width work-pieces may be operated on in such a manner depends on practical consideration, inter alia on the power available which is indeed specifically small but on the whole very much higher than in the earlier instances of removal in shavings, on the possibility of conducting away heat, on the tool material and on the limit which the existing state of the industry imposes on the size and strength of the operating machine necessary for the purpose. If in individual cases this limit is lower than operating on a certain work-piece in the above described manner necessarily requires, the invention may at discretion be carried out in the following manner:

According to Figure 5 a wide work-piece 4 may be operated on by a tool 5 in such manner that the latter executes the stripping action in multiple, for example in four strokes. In this case, there is only insignificant departure from the above described inventive idea only in so far as one cutting edge 6 of the tool separates the material in a vertical plane, so that therefore the entire layer to be stripped is split up into parts, but in parts of such small number that the extra work herefor is vanishingly small.

However, in order to obtain with very wide work-pieces the working conditions according to Figs. 1–4 and consequently their advantages, procedure may be in accordance with Figs. 6–8.

Herein a preparing tool 12—the layer separator—first of all traverses the upper face of the work-piece. Its object is not directly to render, or only quite immaterially, productive work; its duty is to relieve the point and cutting edges of the tool 2 from fracture or abrasion and consequently to prevent this portion of the tool from being burnt or blunted. It functions only in interrupting the continuity of the upper face of the tool by forming a separating groove of the depth of the layer. By means of the separator or separators the layer to be removed is split up into parts, which may be longitudinal, parallel strips, such as would be formed for example on a planing machine. They may be coaxial cylinders of equal size, as would be formed, for instance, on a horizontal lathe, or concentric rings of differing diameter as would be formed on a vertical mill or lathe. The layer portions may also have other forms, for instance, when it is a matter of conical work-pieces. The separating grooves are preferably made as narrow as possible. In the figures they are shown of exaggerated width in order to show that the points and corners of the cutting edges of the stripping tools run freely. They may be formed by means of a stationary tool (a planing or turning tool or the like) or by a tool which is moved (as, for instance, a milling tool or the like). The separating groove is not necessarily formed by cutting action; it may in suitable cases be formed by pressure action, for instance, by a sharp-edged roller or the like.

The layer-separator is followed by the stripping steel element. The latter consists of a cutting tool of, for instance, rhomboidal cross-section formed symmetrically with respect to the direction of motion. The edges of the two symmetrical cutting edges which are of triangular form at their base are parallel to the face worked and operate therefore purely in a horizontal section. Their length and the arrangement of the tool are so chosen that both their edges as well as the two ends of the cutting lips run in separating grooves or outside the edge of the work-piece.

By this form and arrangement of stripping tool it is obtained that the latter turns up at the right and left of itself the material in a condition of reduction which lasts far longer than usual. Its symmetrical form however gives rise to no pressure transversely with respect to the direction of motion. On the other hand there is no drawback in allowing simultaneously to operate in parallel on the work piece a number of tools while positioning in advance a corresponding number of layer-separators and in that manner to operate at one time and a single stroke on one very large surface. In existing machines this possibility has its limit only in the strength of the structural parts or driving force for it is clear that despite a small specific consumption of power an increased working width requires substantially greater execution of work than hitherto usual.

Obviously the faces to be tooled may be transverse to the direction of motion of the tool or curved, wavy, profiled or angular or a combination of these, as for instance the prismatic guides of the beds of planing machines. Moreover the employment of the method is not limited to the tooling of the upper faces of work-pieces, but may extend to depth work, for instance, boring, sawing, milling or reaming and the like.

The separation of the layers and the stripping work, either both or exclusively, need not be effected by stationary tools with continuous relative movement of tool and work-piece. If convenient, in addition to this relative movement, there may be a separate feed or drive for the tool. This may be continuous, for instance, when the layer-separator has the form of a circular saw and receives pressure movement; it may however be intermittent or by jerks, as for instance when the stripping tool is actuated in jerks by compressed air.

The heat arising during tooling may be very effectively conducted away if the tool steel element on its entire cross section is allowed to reach down tightly on the surface operated on, the tool being bored to that extent longitudinally and cooled by air or liquid.

Although it is simplest to permit layer-separator and tool, which may be in one piece or a number of parts assembled to a complete tool, to act at a single operative movement, this is not essential in and by itself for the method. It is conceivable, for example, in order not to stress machine tools too severely and in order nevertheless to work with the full width, that the entire method might be carried out in two operative movements, namely, that the upper layer be separated at the first operative movement and stripped at the second.

A further modification of the method consists in following the stripping tool with a smoothing tool by means of which during the same or a separate operative movement the somewhat rough and uneven surface left at stripping is rendered smooth. This tool may be in one piece with both the others or with one of them, but may be connected to those in front as a separate tool of suitable form.

The essential advantages of this method are in the first place the reduction in specific work consumption owing to the large reduction in conversion to shavings; further, where the upper surface is hard (skin of casting or forging), in considerable preservation of the tool, because the stripping tool works only below the upper surface. The main advantage however consists in this, that in comparison with usual methods considerable time is saved, because with a working speed which, according to trials carried out, approximates to that of a normal lathe or planing machine, any practically allowable breadth can be worked. Obviously to obtain increased production increased driving force has to be applied. These forces may be so important in the case of large machines that the usual kinds of machine at present cannot yield or receive them and need to be reconstructed. With these new machines suitable for carrying out the method there is obtained a multiplication of the output of surface work hitherto produced, in respect either of unit weight of machine tool, or of unit time, or of the wages of the machine-operator.

Fig. 8 particularly shows how a workpiece of a material liable to crumble may be tooled at the edges, namely, by stripping it inwardly, in contradistinction to Fig. 7, wherein it is stripped outwardly.

I claim:—

1. The method of trimming the surface of metallic stock, which consists in cutting a score line from the surface down into the stock so as to divide portions of the surface from each other to the extent of the depth of the trim to be made, and then cutting away such portions of the surface on opposite sides of the score cut in layers equal in thickness to the score cut by oblique cutting actions which are reverse to each other.

2. The method of simultaneously trimming adjacent but separated surfaces of metallic stock, which consists in cutting layers from the surfaces along generally parallel cutting lines by cutting actions oblique to such lines and at reverse oblique angles to each other.

3. The method of surface trimming metallic stock, which consists in forming a score cut extending perpendicularly from the surface down into the body of the stock a depth corresponding to the depth of the trim to be made and so as to divide adjacent portions of the stock surface into trimming areas, and then removing the adjacent areas in layers corresponding in thickness to the depth of the score cut by cutting away the respective layers in planes parallel with the surface and along cutting lines which are generally parallel with the score cut but at reverse oblique cutting angles to each other.

Dated this 24th day of Jan., 1925.

VALENTIN RETTERATH.